Jan. 1, 1952     F. J. UPRIGHT     2,580,864
CHEESE DISPENSER

Filed Dec. 12, 1949     2 SHEETS—SHEET 1

INVENTOR.
FRED J. UPRIGHT
BY
Anderson & Muller
ATTORNEY

INVENTOR.
FRED J. UPRIGHT
BY Anderson & Muller
ATTORNEY

Patented Jan. 1, 1952

2,580,864

UNITED STATES PATENT OFFICE 2,580,864

CHEESE DISPENSER

Fred Joseph Upright, Grant, Nebr.

Application December 12, 1949, Serial No. 132,485

5 Claims. (Cl. 31—20)

This invention relates to improvements in devices for dispensing cheese and similar food products in measured quantities.

Several food products, including various kinds of cheeses, margarine and butter, are today sold in paper packages of various sizes. Some of these products, and especially cheese, is sold in quantities less than a whole package; the part remaining must be kept in a refrigerator to assure that it will be kept from spoiling.

One brand of cheese that is popular and sold in large quantities comes in a paper package of parallelepipedal shape having a length of approximatey 8½ inches, a thickness of 2½ inches and a width of about 2¾ inches. This invention has been designed for use more particularly with the sale of cheese from packages of the size indicated, but it is to be understood that it is not limited to that particular use.

It is the object of this invention to produce a dispensing device of such design that it can be molded from some suitable plastic, and of a size to receive cheese packaged in sizes above described.

Another object is to produce a dispenser that is provided at one end with a hinged door adjacent to which is operatively positioned a device for cutting pieces of any desired length from the cheese package.

A further object is to produce a dispenser that can be readily handled.

Another object is to produce a dispenser having a screw carrying a pusher bar that extends downwardly adjacent the inner end of the cheese package for moving the cheese when the screw is rotated.

The above and other objects that may appear as the description proceeds are attained by means of a construction and a relation of parts that will now be described in detail, for which purpose reference will be had to the accompanying drawing in which the invention has been illustrated, and in which.

Figures 1, 2:
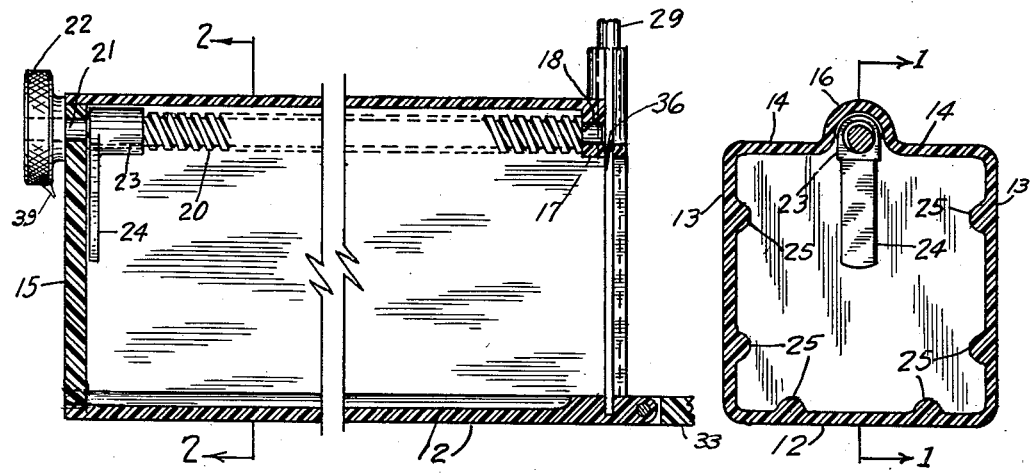
Figure 1 is a longitudinal vertical section of the dispensing device taken on lines 1—1, Figures 2 and 3.
Figure 2 is a transverse section taken on lines 2—2, Figure 1.

In the drawing reference numeral 12 designates the bottom of the box or container forming the subject of this invention, numeral 13 represents the vertical sides and numeral 14 the top, while numeral 15 represents one end of the box. At this point it may be explained that the end 15 is molded separately from the bottom, top and sides, and is secured in place by suitable cement. If the material used is a plastic, the end is usually softened by a solvent such as acetone and inserted into the open end of the box, and thus becomes integrally attached thereto. The top of the box is provided along its median line with an upwardly convex portion 16 that is slightly more than 180° in angular extent. The end of the box toward the right, when viewed as in Figure 1, is provided with a lug 17 that closes the end of the groove in the convex portion 16. This lug is perforated so as to form a bearing for the end 18 of a threaded bar 20. Bar 20 has a reduced portion 21 that is journaled in an opening in end 15 and extends to the outside thereof, where it is provided with a knurled wheel 22 by means of which the threaded bar or screw is rotated. A nut 23 is operatively connected with screw 20 and is provided with a downwardly extending knife blade 24. It will be readily seen from Figure 1 that when screw 20 is rotated in one direction it will move the nut 23 toward the right, and if rotated in the opposite direction will move it toward the left, the nut shown in its most extreme left position.

Figure 3:
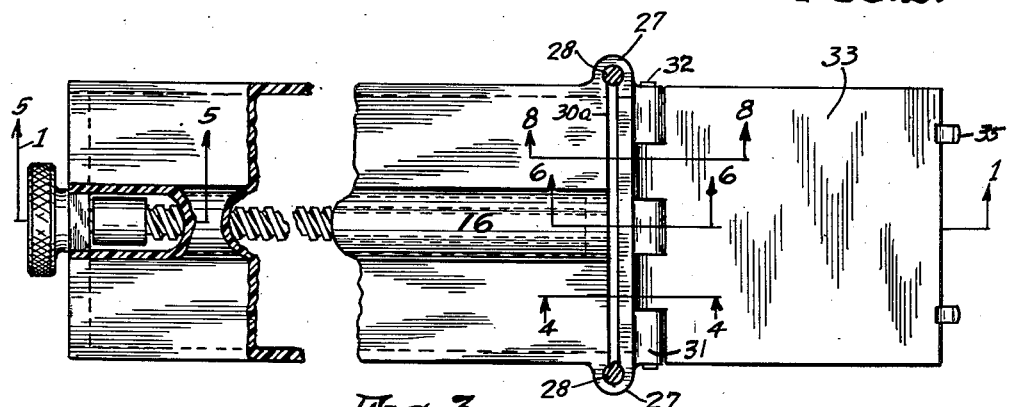
Figure 3 is a top plan view looking downwardly in Figure 1, portions being broken away to more clearly disclose the construction.
Figure 7:
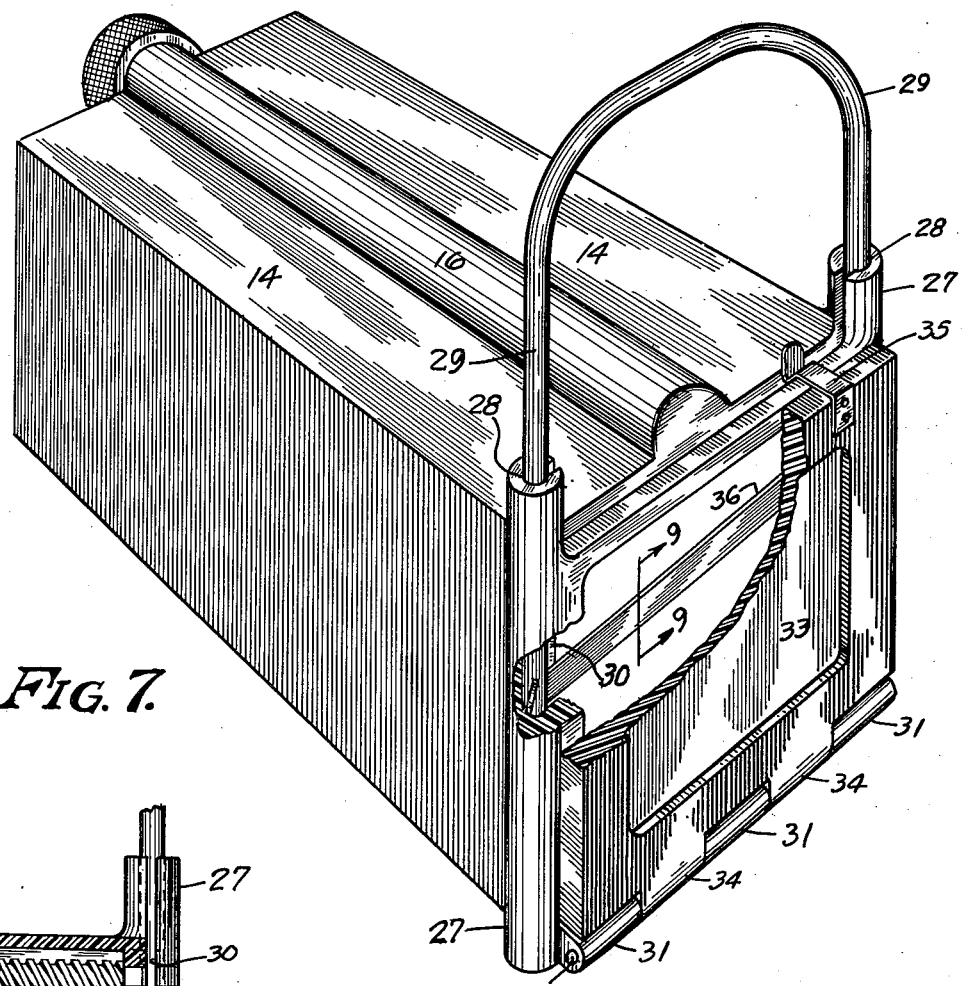
Figure 7 is a perspective view, a portion being broken away to better disclose the construction.
Figure 8:
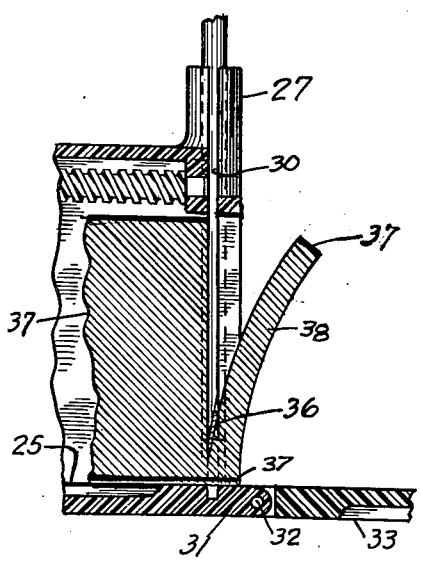
Figure 8 is a section taken on line 8—8, Figure 3.

Bottom 12 and sides 13 are provided with ribs 25 for the purpose of holding the cheese package away from the inner surfaces of the box, and thus reduce friction. The cheese package has been indicated by means of dotted lines 26. Each side of the box is provided with a vertical semi-circular projection 27 that has a central opening 28 for the reception of the parallel sides 29 of a U-shaped metal handle to which reference will be made and which will be described in detail hereinafter. Openings 28 are connected with the inside of the box through slots 30. Top 14 is provided with a slot 30a which connects the two openings 28 in the manner shown in Figure 7. The bottom is provided with projecting spaced lugs 31 that are perforated for the reception of a hinge pin 32. A door 33 is provided with perforated hinge lugs 34 so positioned that they enter the spaces between adjacent lugs 31. Hinge pin 32 extends through lugs 34 as well as through lugs 32, and forms a hinge in the usual manner. The door can be moved into closed position as shown in Figure 7, or into extended open position as shown in Figures 3 and 8. When the door is in the position shown in Figure 7, it is held in that position by means of a spring 35 or any other suitable means.

Figures 9, 10:
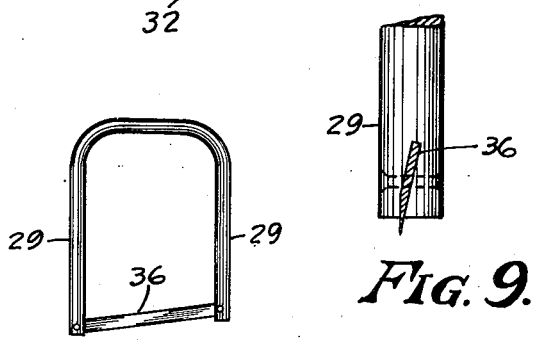
Figure 9 is a section taken on line 9—9, Figure 7.
Figure 10 is a diagram of the knife blade and handle showing the position of the knife blade relative to the handle.

The ends of side members 29 of the U-shaped handle are connected by means of a steel knife blade 36. This knife blade is preferably positioned as shown in Figure 9; that is, it is inclined with respect to the axis or plane of the U-shaped member. Knife blade 36 is also inclined with respect to the handle in the manner shown in Figure 10. This is for the purpose which will presently appear.

Figures 4, 5, 6:
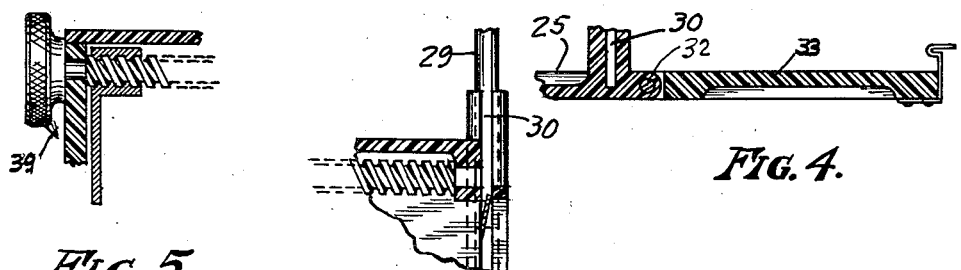
Figure 4 is a section taken on lines 4—4, Figure 3.
Figure 5 is a section taken on lines 5—5, Figure 3.
Figure 6 is a section taken on lines 6—6, Figure 3.

Let us now assume that the dispensing device or box has been constructed in the manner described and shown, and that a package of cheese, is positioned in the box. Door 33 is then opened and screw 30 rotated by the end wheel 22 so as to project the right-hand end of the cheese package in the amount desired. While the cheese is being projected, the cutting knife blade 36 occupies a position like that shown in Figure 1. When the desired length of cheese has been projected, the U-shaped handle is moved downwardly, whereupon the knife blade begins to cut at one corner of the cheese package. It may be explained at this point that said cheese comes in a container made from quite heavy paper, which has been shown in Figure 8 and designated by reference numeral 37, and this would be difficult to cut if the blade were parallel to it. The knife blade has therefore been inclined as shown in Figure 10. From Figure 4 it will be seen that the knife blade slot 30 extends down below the top of ribs 25, thereby permitting the knife blade to cut entirely through the cheese and the bottom layer of the covering. Referring now more particularly to Figure 8, it will be observed that due to the inclination of knife blade 36, the slice of cheese 38 that is being severed is inclined outwardly away from the knife blade, and therefore the resistance is reduced over what it would be if a thin blade in the plane of motion were employed.

It is contemplated to provide the knurled wheel 22 with a pointer 39 in such a way that it will indicate on a scale on the outer surface of end 15 the distance that the cheese is projected. Since cheese sold in packages of this kind always comes in the same size package, the weight or quantity is directly proportional to the length of the slice severed, and it is therefore possible to correctly gage the thickness of the slice.

Attention is directed to the fact that the box that has been shown on the drawing and described herein is so designed that it can be readily molded in one operation. End 15, as above explained, is inserted after the remainder of the box has been molded. The parts at the right-hand end of the box which is normally open have been designed in such a manner that they will not interfere with the withdrawal of the molded box from the mold, and so that the openings for parts 29 and for the hinge pin 32 can be formed at the time the box is molded. The door and end 15 are formed in separate molds. Due to the fact that end 15 is inserted after the box is otherwise formed, threaded member 20 and nut 23 can be assembled in end 15 before the latter is attached to the open end of the box.

Having described the invention, what I claim as new is:

1. A device for dispensing cheese and the like in measured quantities comprising an elongated box having one end open and the other end closed, a screw supported for rotation within the box near the top thereof, means accessible on the outside of the box for turning the screw, a nut operatively connected with the screw, the under surface of the top of the box which the screw and nut are positioned forming means for limiting the rotation of the nut about the axis of the screw, a blade secured to the nut, projecting downwardly therefrom, vertical tubular guides adjacent the open end of the box, a U-shaped handle having parallel side arms slideable in the guides, the inner wall of each tubular guide having a slot extending down to a point below the upper surface of the bottom communicating the guide openings with the interior of the box, and a knife blade connecting the lower ends of the U-shaped handle, said knife blade extending through the slots.

2. A device in accordance with claim 1 in which the upper surface of the bottom has longitudinally extending ribs for slideably supporting a food package.

3. A device in accordance with claim 1 in which the bottom has a door pivoted thereto for movement from an open position parallel with the bottom to a position perpendicular thereto forming a closure, and means for latching the door in closed position.

4. A device for dispensing cheese or the like in measured quantities, from an elongated package, comprising, an elongated box of substantially the same cross sectional shape as the food package, the top of the box having a groove in its under surface extending substantially the entire length of the box, the front end of the box being normally open, and the rear end closed, a bearing block in the groove near the front end, a screw positioned in the groove, the front end of the screw being journaled in the bearing block, the rear end of the box having a bearing for the rear end of the screw, a hand wheel on the screw accessible from the outside of the box, a nut operatively connected with the screw, the nut having a downwardly extending blade for engaging the inner end of a food package to move it toward the open end of the box, the box having vertically extending tubular guides on the outside of the box sides near the open end of the box, said box being provided with slots interconnecting the guides and the interior of the box, a U-shaped handle having its sides slideable in the guides, and a knife blade connecting the ends of the handle, said blade being vertically movable in the slots for slicing sections from a food package.

5. A device in accordance with claim 4 in which a door is hinged to the bottom at the open end of the box movable from a closed vertical position to a horizontal position in which it forms an extension of the bottom.

FRED JOSEPH UPRIGHT.

(References on following page)

REFERENCES CITED

The following references are of record in the file of this patent:

UNITED STATES PATENTS

| Number | Name | Date |
|---|---|---|
| 502,170 | Brundin | July 25, 1893 |
| 803,807 | Burks | Nov. 7, 1905 |
| 938,063 | Kunick | Oct. 26, 1909 |
| 1,022,125 | Decker | Apr. 2, 1912 |
| 2,251,844 | Keefer | Aug. 5, 1941 |

FOREIGN PATENTS

| Number | Country | Date |
|---|---|---|
| 117 | Great Britain | 1907 |
| 37,709 | Sweden | May 26, 1913 |
| 765,150 | France | Mar. 19, 1934 |